Sept. 3, 1946.   D. J. ORR   2,406,965
VARIABLE DELIVERY FLUID HANDLING DEVICE
Filed March 30, 1943
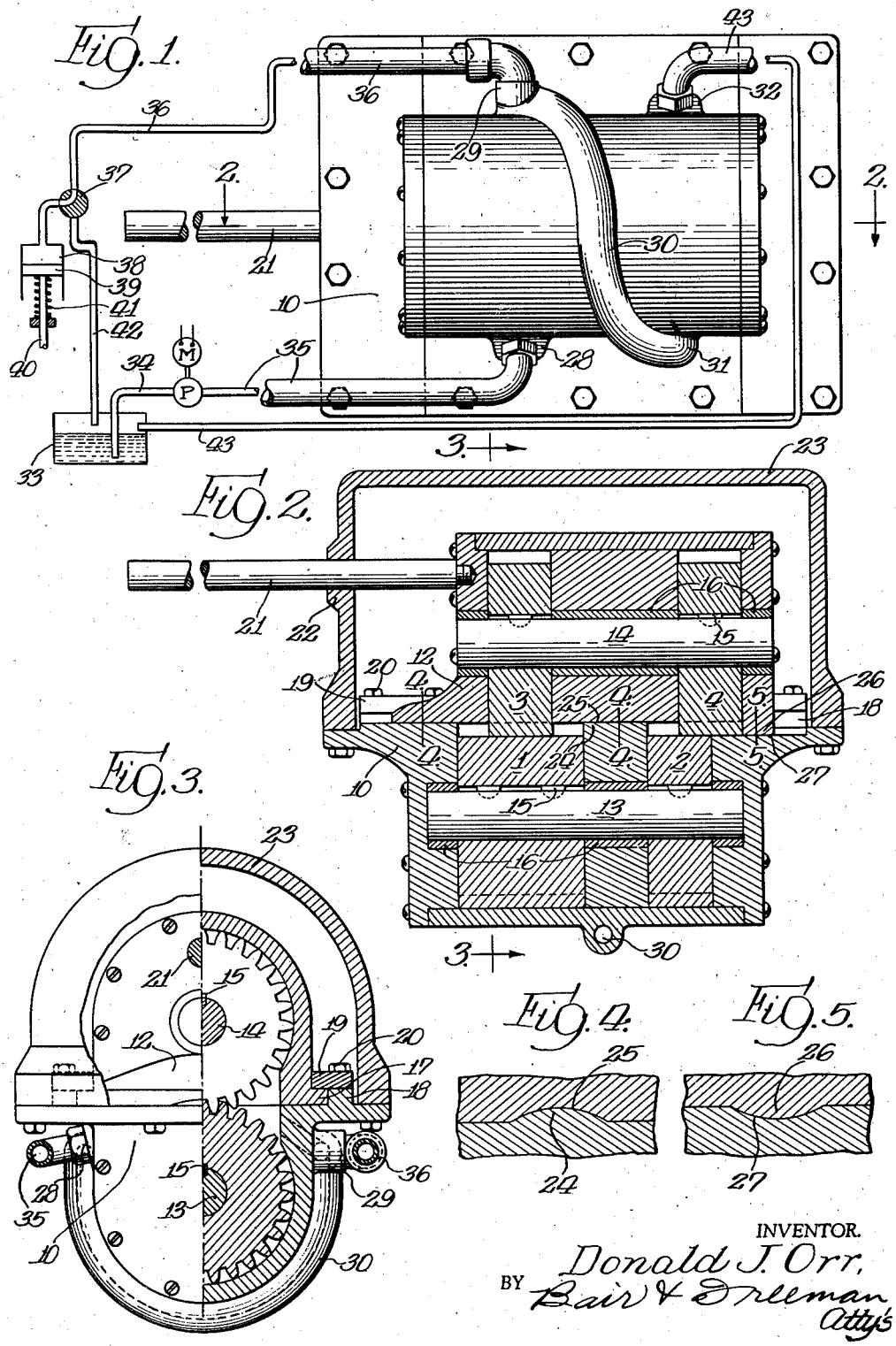
INVENTOR.
Donald J. Orr,
BY Bair & Freeman
Atty's Patented Sept. 3, 1946

2,406,965

UNITED STATES PATENT OFFICE 2,406,965

VARIABLE DELIVERY FLUID HANDLING DEVICE

Donald J. Orr, Arnolds Park, Iowa

Application March 30, 1943, Serial No. 481,120

3 Claims. (Cl. 103—120)

My present invention relates to a variable delivery fluid handling device for varying the amount of oil or other power-transmitting fluid to a hydraulic power device and returning the excess oil to the supply side of a pump that places the oil under pressure.

One object of the invention is to provide a fluid handling device wherein the maximum of power deliverable by the oil at the operating pressure produced by the pump, is transmitted to the oil-operated device regardless of the amount of oil by-passed back to the reservoir, the speed of operation of the oil-operated device being controllable through an infinite number of relationships from zero to maximum with relation to the oil being delivered by the pump.

Another object is to provide a fluid handling device including transmission gears which are operated by the oil, such operation being effected by that portion of the oil that is by-passed back to the reservoir as well as that which flows on to the oil-operated device, the transmission gears being operatively interconnected to utilize the by-passed oil in producing pressure on the oil that is furnished to the oil-operated device.

More particularly it is my object to provide a fluid handling device including transmission gears which may be meshed in varying degrees to secure a variation in the quantiy of oil supplied from the by-pass valve to the oil-operated device in proportion to that supplied to the by-pass valve.

With these and other objects in view, my invention consists in the construction, arrangement and combination of the various parts of my device whereby the objects contemplated are attained, as hereinafter more fully set forth, pointed out in my claims and illustrated in the accompanying drawing wherein:

Figure 1 is a bottom plan view of a valve delivery fluid handling device embodying my invention and showing it diagrammatically connected with a pump and an oil-operated device;

Figure 2 is a vertical sectional view as on line 2—2 of Figure 1;

Figure 3 is a partial end elevation and partial sectional view, with the section taken on the line 3—3 of Figure 2, and in the end view a part of the outer casing broken away to show internal structure;

Figure 4 is a sectional view on either of the lines 4—4 of Figure 2; and

Figure 5 is a similar sectional view on the line 5—5 of Figure 2.

On the accompanying drawing I illustrate a two-part housing for transmission gears 1, 2, 3 and 4. The two parts of the housing are indicated at 10 and 12 respectively. The housings 10 and 12 are formed with cavities similar to those of an ordinary gear pump to accommodate the transmission gears 1, 2, 3 and 4. The gears 1 and 2 are housed in the section 10 and the gears 3 and 4 in the section 12.

The gears 1 and 2 are operatively connected together by a shaft 13 while the gears 3 and 4 are similarly operatively connected together by a shaft 14. Keys 15 may be provided for this purpose. The shafts 13 and 14 are rotatable in bearings 16 of the housing sections 10 and 12.

The housing section 12 is slidable axially relative to the housing section 10. For guiding the section 12 relative to the section 10, the section 12 has a pair of outwardly directed flanges 17 as shown in Figure 3 guided between ribs 18 of the section 10. Retainer strips 19 are bolted as at 20 to the ribs 18. An operating rod 21 is threaded into one end of the housing section 12 and passes slidably through a boss 22 formed on an outer casing 23. A suitable control lever (not shown) may be connected with the rod 21.

To insure a proper sliding fit of the housing section 12 relative to the section 10 adjacent the meshing point on each side of the gears 1 and 3, the lower side of the section 10 is formed with an upward projection 24, see Figure 4, fitting a concave surface 25 of the upper section 12. Reversely, the upper section has a downward projection 26 shown in Figure 5, fitting a concave surface 27 of the lower section 10. The concavities at 25 and 27 are formed on the radius of the outer end of the gear teeth.

The housing section 10 is provided with an inlet boss 28 adjacent the intake sides of the gears 1 and 3. Adjacent the outlet sides thereof an outlet boss 29 is provided. A by-pass passageway 30 is formed on the housing section 10 to connect with the inlet sides of the gears 2 and 4 indicated at 31. The outlet sides of these two gears communicate with a return boss 32.

In Figure 1, I show the hydraulic connections in a system where my fluid handling device may be used. A reservoir 33 is provided for a supply of oil. A pump P pumps oil therefrom through pipes 34 and 35 to the inlet boss 28. The pump P may be driven, by way of example, from an electric motor M. An oil supply pipe 36 is connected with the outlet 29 and supplies oil through a valve 37 to an oil-operated power device, such as the cylinder 38. A piston 39 is illustrated therein for propelling a piston rod 40, the piston being returnable by a spring 41. The oil-operated device may be any type of apparatus where a variable amount of oil under pressure is desired for operating the oil-operated device at various selected speeds. A feed on a planer or shaper is a good example.

The valve 37 is connected with a return line 42 which returns oil from the cylinder 38 to the reservoir 33 when it is desirable to return the piston 39. The by-pass boss 32 of my by-pass valve is connected by a pipe 43 with the reservoir 33 for returning by-passed oil thereto, as will be hereinafter described.

*Practical operation*

In the operation of my variable delivery fluid handling device, assuming that the parts are set in the position shown in Figure 2, all of the oil supplied by the pump P will pass around the gears 1 and 3, thereby driving them at predetermined speeds determined by the capacity of the teeth of the narrow gear 3. Since the gear 4 is in midposition with relation to the gear 2, one-half of this oil will go to the oil-operated device 38 and the other half will go through the passageway 30 and around the gears 2 and 4, and then back through the return line 43 to the reservoir 33. The half of the oil that is being by-passed around the gears 2 and 4 imparts rotation thereto, which, in turn, is transmitted through the shafts 13 and 14 to drive the gears 1 and 3 and thereby aid in applying pressure to the oil passing around the gears 1 and 3 to the outlet pipe 36. Accordingly, the power represented by the pressure of the by-passed oil around the gears 2 and 4 is transmitted to the oil being supplied to the oil-operated device. By such an arrangement there is no loss of power whatever, regardless of the amount of oil being by-passed back to the reservoir 33.

Obviously, if the casing section 12 were moved toward the right in Figure 2, less extent of the teeth of the gear 4 would mesh with the teeth of the gear 2, and hence there would be less by-passed oil and more of the constant quantity of oil being supplied around the gears 1 and 3 would go to the oil-operated device. If the housing section 12 is moved to the left, then more oil is by-passed, and less goes to the oil-operated device. Thus the speed of the oil operated device may be increased or decreased, as desired, by sliding the rod 21 in the proper direction and to the position desired for operating the oil-operated device at the desired speed, regardless of the speed of the pump P.

The oil-operated device may be adjusted in speed from zero to maximum and at each position the energy represented by the by-passed oil will be utilized in proportion to the amount of by-passed oil and effect elimination of any loss of power due to by-passing some of the oil.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. A device of the type described comprising a two-section housing, first and second transmission gears in one section thereof, third and fourth transmission gears in the other section thereof, said first and third gears meshing with each other and the first one being wider than the third one, said second and fourth gears meshing with each other, a shaft operatively connecting said first gear with said second gear, a shaft operatively connecting said third gear with said fourth gear, one of said housing sections being movable axially of the other one to vary the position of mesh of said first gear with relation to and between the limits of width of said third gear and to vary the degree of mesh of the second and fourth gears relative to each other, an inlet hydraulically connected with the intake side of said first and third gears, said first and third gears being driven by the fluid supplied to said inlet from a source of fluid supply, a power delivering outlet hydraulically connected with the outlet side of said first and third gears, an inlet and an outlet connected to the inlet side and the outlet side respectively, of said second and fourth gears, a single by-pass connection between said first-named outlet and the inlet of said second and fourth gears, said second and fourth gears being driven by said shafts and by fluid from said by-pass connection, and a return pipe hydraulically connected with the outlet of said second and fourth gears and returning fluid to the source of supply of said first-named inlet.

2. A device of the type described comprising a two section housing, first and second transmission gears in one section thereof, third and fourth transmission gears in the other section thereof, said first and third gears meshing with each other and one being wider than the other, said second and fourth gears meshing with each other, means for operatively connecting said first gear with said second gear, means for operatively connecting said third gear with said fourth gear, one of said housing sections being movable axially of the other one to vary the degree of mesh of the second and fourth gears relative to each other and to shift the postion of mesh of the narrower gear with relation to said wider gear, an inlet hydraulically connected with the intake side of said first and third gears, said first and third gears being driven by the fluid supplied to said inlet from a source of fluid supply, a power delivering outlet hydraulically connected with the outlet side of said first and third gears, an inlet and an outlet connected to the inlet side and the outlet side respectively, of said second and fourth gears, a by-pass connection between said first-named outlet and the inlet of said second and fourth gears, said second and fourth gears being driven by said means and by fluid from said by-pass connection, and a return pipe hydraulically connected with the outlet of said second and fourth gears and returning fluid to the source of fluid supply of said first-named inlet.

3. In a device of the type described, a two section housing, a pair of transmission gears in one section thereof, a second pair of transmission gears in the other section thereof and one of said second gears being wider than the other, said first pair of gears meshing with said second pair of gears, one of said second pair of gears being wider than that one of said first pair of gears with which it meshes, a shaft operatively connecting said first pair of gears with each other, a shaft operatively connecting said second pair of gears with each other, one of said housing sections being movable axially of the other one to vary the position of mesh of one of said first gears with relation to said wider gear and to vary the degree of mesh of the other first gear relative to the other second gear, an inlet hydraulically connected with the intake side of said first meshing gears said first meshing gears being driven by liquid supplied to said inlet from a source of fluid supply, a power delivering outlet hydraulically connected with the outlet side of said first meshing gears, an inlet and an outlet connected to the inlet side and outlet side, respectively, of said second meshing gears, a by-pass connection between said first-named outlet and the inlet of said second meshing gears, said second gears being driven by said shafts and by liquid from said by-pass connection, and a return pipe hydraulically connected with the outlet of said second meshing gears and returning the fluid to the source of supply of first-named inlet.

DONALD J. ORR.